United States Patent [19]
Heitz et al.

[11] Patent Number: 5,612,451
[45] Date of Patent: Mar. 18, 1997

[54] AMPHOTERIC METAL OXIDES AS COCATALYST IN THE ELECTROPHILIC SYNTHESIS OF POLYARYL ETHER KETONES

[75] Inventors: Thomas Heitz, Dannstadt-Schauernheim; Alexander Glück, Bad Dürkheim; Walter Heitz, Kirchhain; Ralf Richter, Cölbe, all of Germany

[73] Assignee: BASF Aktiengesellschaft, Ludwigshafen, Germany

[21] Appl. No.: 498,971

[22] Filed: Jul. 6, 1995

[30]     Foreign Application Priority Data

Jul. 11, 1994 [DE] Germany ............... 44 24 039.2

[51] Int. Cl.$^6$ ............... C08G 67/02; C08G 8/02
[52] U.S. Cl. ............ 528/392; 528/222; 528/223; 528/224; 528/225; 528/271
[58] Field of Search ............ 528/392, 271, 528/225, 224, 223, 222

[56]              References Cited

U.S. PATENT DOCUMENTS

| 3,925,307 | 12/1975 | Dahl et al. | |
|---|---|---|---|
| 4,709,007 | 11/1987 | Jansons et al. | 528/222 |
| 4,870,153 | 9/1989 | Matzner | 528/125 |
| 4,908,425 | 3/1990 | Robeson et al. | 528/125 |
| 5,120,818 | 6/1992 | Robeson et al. | 528/125 |

FOREIGN PATENT DOCUMENTS

| 264194 | 4/1988 | European Pat. Off. . |
|---|---|---|
| 84/03891 | 10/1984 | WIPO . |
| 84/03892 | 10/1984 | WIPO . |

*Primary Examiner*—Shelley A. Dodson
*Attorney, Agent, or Firm*—Keil & Weinkauf

[57]              ABSTRACT

Polyaryl ether ketones are prepared by electrophilic polycondensation using acyl halides as monomer components in the presence of a Lewis acid, by a process in which from 0.001 to 60% by weight of an inert filler or of a component which can be converted into an inert filler during working up are added to the reaction mixture before or during the polycondensation.

4 Claims, No Drawings

AMPHOTERIC METAL OXIDES AS COCATALYST IN THE ELECTROPHILIC SYNTHESIS OF POLYARYL ETHER KETONES

BACKGROUND OF THE INVENTION

The present invention relates to a process for the preparation of polyaryl ether ketones by electrophilic polycondensation using acyl halides as a monomer component in the presence of a Lewis acid.

Polyaryl ether ketones, in particular all para-bonded polyaryl ether ketones, have a large number of interesting properties, for example processability by thermoplastic methods, high-temperature stability, mechanical stability and excellent resistance to chemicals.

The literature describes two synthesis methods for the preparation of polyaryl ether ketones. In the case of the nucleophilic procedure, ether bonds are established between hydroxyaromatics and aromatics activated with respect to nucleophilic aromatic substitution.

In the case of the electrophilic procedure, generally aromatic dicarboxylic acid derivatives or phosgene are reacted with suitable aromatic compounds which contain two hydrogen atoms capable of electrophilic substitution, with formation of a diaryl ketone linkage, or an aromatic carboxylic acid derivative which contains both an acid derivative group and a substitutable hydrogen atom is subjected to autopolycondensation. U.S. Pat No. 3,441,538, U.S. Pat. No. 3,442,857, U.S. Pat. No. 953,400, DE-A 32 41 444, DE-A 34 16 445 and DE-A 34 16 446 describe electrophilic polycondensation reactions in which HF is used as a solvent and $BF_3$ as a catalyst. Alternatively, halogenated hydrocarbons may also be used as solvents, in combination with other Lewis acids, in particular $AlCl_3$, as a catalyst.

In these cases, it has proven advantageous to carry out the reaction in the presence of a Lewis base to be used in more than stochiometric amounts, in order to reduce the activity of the Lewis acid and hence to steer the substitution of the electron-rich aromatic by the acyl chloride selectively to the para position. Undesirable secondary reactions with the solvent or ortho substitutions of the electron-rich aromatic by the acyl chloride can thus be substantially suppressed (WO 84/03891 and WO 84/03892). The suppression of secondary reactions, for example the alkylation of the polyaryl ether ketones by the solvent or the ortho-acylation Of activated aryloxy groups, leads to an industrially usable molecular weight and sufficient melt stability of the polymers and permits the processing of the products by extrusion or injection molding.

A feature common to all electrophilic polycondensation processes is the working up of the products by hydrolysis, the polyaryl ether ketone/Lewis acid complex formed as an intermediate being destroyed. This working up by hydrolysis gives large amounts of aqueous solutions of Lewis acid catalysts, in particular aluminum chloride, which lead to pollution of waste water. In particular, the use of Lewis bases as a moderator in the polycondensation causes a significantly higher consumption of Lewis acid catalyst since some of the Lewis acid catalyst is deactivated by complex formation with the Lewis base. According to U.S. Pat. No. 4,709,007, a further equivalent of catalyst is required per equivalent of Lewis base used, the amount of Lewis base usually used being preferably 0.5 equivalent, based on the carbonyl groups present in the polymer. This leads to an increase in the pollution of the waste water by residual amounts of Lewis base and by hydrolysis products of the Friedel-Crafts catalyst.

It is an object of the present invention to provide a process for the preparation of polyaryl ether ketones by electrophilic polycondensation which does not have the disadvantages described above but in which high molecular weight, crystalline polyaryl ether ketones having good melt stability can nevertheless be prepared.

SUMMARY OF THE INVENTION

We have found that this object is achieved, according to the invention, by a process for the preparation of polyaryl ether ketones by electrophilic polycondensation using carboxylic acid derivatives and electron-rich aromatics as monomer components in the presence of a Lewis acid as a catalyst, wherein from 0.01 to 60% by weight of an inert filler or of a component which can be converted during the working up into an inert filler are added to the reaction mixture before or during the polycondensation.

Preferred embodiments of the process are described in the sub-claims.

Carboxylic acid derivatives suitable for the electrophilic polycondensation, in particular acyl halides, are known to a person skilled in the art and are described in the literature, in particular in the patents cited at the outset, so that further information is unnecessary here. The chlorides of terephthalic and/or isophthalic acid may be mentioned here merely as examples of preferred acyl halides. The suitable electron-rich aromatics are also known to a person skilled in the art and are described in the stated literature, and for further details the statements made there are therefore referred to. Particularly preferred compounds are 4,4-diphenoxy-benzophenone, diphenyl ether, 1,4-diphenoxybenzene and 1,4-bis(4-phenoxybenzoyl)benzene, to mention but four typical examples.

The process claimed is suitable for the preparation of polyaryl ether ketones having any desired repeating units, ie. in principle all polymers in whose main chain aromatic structural units are linked to one another essentially by -CO- or -O- bridges. In addition to these types of linkages, smaller amounts of other linking units, for example $-SO_2-$, may also be present.

Preferred polyaryl ether ketones have the structure

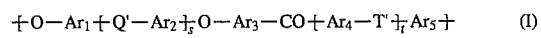 (I)

where s and t are each 0, 1, 2 or 3 and Q' and T' may each be -O- or -CO-. $Ar_1$, $Ar_2$, $Ar_3$, $Ar_4$, and $Ar_5$ independently of one another are each an m-phenylene, p-phenylene, biphenylene or naphthylene group or a $C_1-C_{12}$-alkyl, $C_1-C_6$-alkoxy, aryl, chlorine or fluorine derivative of such a group. Polyaryl ether ketones in which Q' and T' are each -CO- and s and t are each 1 are preferred.

The novel process is carried out in the presence of a Lewis acid and preferably in a solvent which is inert under the reaction conditions.

The Lewis acid is used in excess, based on the molar amount of carbonyl groups and acyl halide groups used, and the excess must be sufficient to catalyze the reaction. In general, a molar excess of from 0.02 to 1.00, preferably from 0.1 to 0.8, equivalent, based on the molar amount of carbonyl groups and acyl halide groups present, of Lewis acid is sufficient for this purpose. An excess of from 0.3 to 0.6 equivalent of a Lewis acid is particularly preferred.

If the monomers contain basic groups, for example sulfonyl groups, the excess of Lewis acid is advantageously based on the amount of carbonyl, acyl halide and further basic groups used.

Suitable Lewis acids for the novel process are in principle all compounds which can form a coordinate bond with a lone electron pair of a compound. Corresponding compounds are known to a person skilled in the art and are described in the literature, in particular in the patents stated at the outset. $AlCl_3$, $AlBr_3$, $InCl_3$, $GaCl_3$, $BCl_3$, $ZnCl_2$, $FeCl_3$, $SnCl_4$, $TiCl_4$ and $MoCl_5$ may be mentioned here as examples, anhydrous $AlCl_3$ being particularly preferred.

Preferably used inert solvents are polar solvents whose dielectric constant is at least 2.5, preferably from 4.0 to 25 (at 25° C.). Methylene chloride, carbon disulfide, 1,2-dichloroethane, 1,1,2,2-tetrachloroethane and 1,2-dichlorobenzene and mixtures thereof may be mentioned here as examples. Methylene chloride is particularly preferred.

The temperature at which the reaction is carried out is in general from −60° to 150° C., preferably from −30° to 30° C.

Although it is advantageous to use all solvents and monomers in anhydrous form, traces of water have in some cases proven useful with regard to the course of the reaction.

According to the invention, from 0.01 to 60, preferably from 0.1 to 50%, by weight, based on the amount of polyaryl ether ketone formed, of an inert filler or of a compound which can be converted into an inert filler during the subsequent working up are added to the reaction mixture before or during the polycondensation.

Suitable fillers are amphoteric metal oxides, derivatives thereof, for example oxides, alkoxides or hydroxides of aluminum, double salts of alkali metals or alkaline earth metals with aluminum and aluminosilicates, alumina in an amount of from 5 to 20% by weight being preferred.

The process according to the invention is preferably carried out without the addition of Lewis bases during the polycondensation; however, Lewis bases present during the condensation do not in principle have an adverse effect on the quality of the polyaryl ether ketones prepared but are also of no advantage. Accordingly, Lewis bases are no longer absolutely essential for the synthesis of high molecular weight polyaryl ether ketones having good melt stability.

The novel process gives high-quality, high molecular weight, crystalline polyaryl ether ketones having good melt stability in a simple manner without requiring the use of Lewis bases in the polycondensation. The polyaryl ether ketones prepared by the novel process surprisingly even possess higher melt stability than products which were subjected to polycondensation in the presence of Lewis bases. Furthermore, the polycondensation in the presence of amphoteric metal oxides without the use of Lewis bases requires significantly smaller amounts of Lewis acid catalyst, resulting in an ecological advantage in the working up by hydrolysis, owing to substantially less pollution of the waste water. A lower salt load of the waste water furthermore arises from the possibility of reusing the Lewis acid catalysts preferred according to the invention, for example anhydrous halides of aluminum, as amphoteric metal oxides in the polycondensation after the products have been worked up by hydrolysis. The amphoteric metal oxides then remain as an inert filler in the polymer and, as described in DE-C 2 419 044, increase the melt stability of the products.

After the polycondensation is complete, the reaction material is worked up by known methods described in the literature. This is preferably effected by adding a Lewis base whose complex formation constant with respect to the Lewis acid is greater than its complex formation constant with respect to the carbonyl groups of the polymer and which therefore liberates the free polymer from the Lewis acid/polymer complex. Examples of such Lewis bases appear in the abovementioned WO 84/03891. Water and methanol and mixtures thereof are preferably used. After this decomplexing and, if required, comminution of the product, the latter may furthermore be extracted with a suitable solvent for purification.

DESCRIPTION OF THE PREFERRED EMBODIMENTS

EXAMPLES

Example 1 (Use of basic alumina as inert filler) A 1 l flask having a plane ground neck and provided with a KPG stirrer, a nonreturn valve and a gas inlet tube was evacuated three times and filled with nitrogen. At −30° C., 111,374 g (0.835 mol) of aluminum trichloride and 20.00 g (0.196 mol) of alumina (basic, activity level I, particle size 0.063–0.200 mm, Merck AG) were suspended in 180 ml of methylene chloride and stirred for 15 minutes at this temperature (900 rpm). 1.012 g (0.0070 mol) of benzoyl chloride, 40.605 g (0.200 mol) of terephthaloyl dichloride and 74.603 g (0.204 mol) of 4,4'-diphenoxybenzophenone were added in successively to the catalyst suspension at −30° C. The reaction temperature was increased to 0° C. with vigorous stirring (900 rpm), the reaction mixture solidifying after 90 minutes.

The reaction temperature was then increased to 22° C. in the course of 60 minutes. After a total reaction time of 5 hours, the reaction product was removed mechanically from the flask. The viscous material obtained was mechanically comminuted.

In order to decomplex the polymer/catalyst complex, 3 l of demineralized water were cooled to 10° C. in a 10 l vessel with an Ultra-Turrax, and the comminuted polymer/catalyst complex was introduced in the course of 10 minutes. Complete decomplexing of the polymer was effected in the course of 15 minutes.

The polymer was filtered off and was dried in an airstream for 30 minutes. The extraction was carried out continuously in a 2 l flask having a plane ground neck and provided with a KPG stirrer, a water feed and a filtration unit. The polymer flocks having a size of about 1 mm were extracted with demineralized water for 8 hours at 60° C. at a flow rate of 15 l/h. The test for chloride ions in the filtrate was carried out with silver nitrate solution, chloride being no longer detectable after 4 hours. The polymer was filtered off and was predried for 12 hours at 100° C. in an airstream. Drying was then carried out for a further 8 hours at 160° C. (1 mmHg).

Yield: 110 g (92% of theory)

To determine the viscosity, 0.5 g of polymer was swelled in 6 ml of chloroform and dissolved with the addition of 6 ml of trifluoroacetic acid. The solution was filtered and the polymer was precipitated from 180 ml of methanol. After drying (12 hours at 100° C., 8 hours at 160° C., 1 mmHg), the inherent viscosity was determined in concentrated sulfuric acid as 0.951 dl/g (1% strength solution in $H_2SO_4$ at 25° C.).

The melt stability was determined in a rheological test kneader under inert gas. The relative increase in torque of polymer melt was monitored over a period of 60 minutes at 420° C. and 60 rpm.

An increase in torque from 571 to 870 relative units indicates the very good melt stability of the polymer, the increase being determined as 52% according to $\Delta M/M_0 \cdot 100$, when ΔM is the difference between the initial and final torque and $M_0$ is the initial torque, and being a measure of the melt stability.

Example 2 (Use of basic alumina as an inert filler)

Example 1 was repeated, except that only 5 g of alumina (0.049 mol) were used.

A polymer having an inherent viscosity of 0.879 dl/g was obtained (1% strength solution in 96% strength sulfuric acid at 25° C.).

Yield: 102 g

An increase in the torque from 451 to 702 relative units indicates the very good melt stability of the polymer, the increase having been determined as 55% and being a measure of the melt stability.

Example 3 (Comparative example: basic alumina not used)

Example 1 was repeated, except that no alumina was used.

A polymer having an inherent viscosity of 0.888 dl/g was obtained (1% strength solution in 96% strength sulfuric acid at 25° C.).

Yield: 99 g

An increase in the torque from 388 to 655 relative units indicates the substantially lower melt stability of the polymer compared with Examples 1 and 2, the increase having been determined as 68.8% and being a measure of the melt stability.

Example 4 (Comparative example: polycondensation in the presence of the Lewis base dimethyl sulfone)

The following were reacted under the reaction conditions described in Example 1:

| Aluminum trichloride | 147.335 g | 1.1050 mol |
| --- | --- | --- |
| Dimethyl sulfone | 28.239 g | 0.3000 mol |
| Benzoyl chloride | 10.012 g | 0.0070 mol |
| Terephthaloyl dichloride | 40.605 g | 0.2000 mol |
| 4,4'-Diphenoxybenzophenone | 74.603 g | 0.2040 mol | dimethyl sulfone being added after the addition of aluminum trichloride and before the addition of benzoyl chloride.

A polymer having an inherent viscosity of 1.067 dl/g was obtained (1% strength solution in 96% strength sulfuric acid at 25° C.).

Yield: 97 g

An increase in the torque from 728 to 1378 relative units indicates the lower melt stability of the polymer compared with Examples 1 to 3, the increase having been determined as 89.3% and being a measure of the melt stability.

The table below compares Examples 1 to 4.

| Ex. No. | Filler[1] | Filler in % by weight[2] | Catalyst/ CO[3] | $\eta_{inh}$ dl/g[4] | Stability $M_{End}/M_o$ |
| --- | --- | --- | --- | --- | --- |
| 1 | $Al_2O_3$ | 20.00 | 1.39 | 0.95 | 1.52 |
| 2 | $Al_2O_3$ | 5.00 | 1.39 | 0.88 | 1.56 |
| 3 | — | 0.00 | 1.39 | 0.89 | 1.69 |
| 4 | $Me_2SO_2$ | 28.24 | 1.84 | 1.07 | 1.89 |

[1] Filler or Lewis base used (in Example 4)
[2] Content of Lewis base or filler in % by weight, based on polymer
[3] Molar ratio of $AlCl_3$ to carbonyl groups in the polymer
[4] Inherent viscosity in dl/g (1% strength solution in $H_2SO_4$ at 25° C. after precipitation once from a 1:1 trifluoroacetic acid/chloroform solution)
[5] Melt stability $M_{end}/M_o$ determined by rheological test kneader (increase in torque at 420° C. and 60 rpm after 60 minutes under Ar)

We claim:

1. A process for preparing polyaryl ether ketones which comprises: electrophilically polycondensing an acyl halide and an electron rich aromatic in a reaction mixture in the presence of a molar excess of a Lewis acid, from 0.01 to 60% by weight, based on the weight of the prepared polyaryl ether ketone being added to the reaction mixture before or during polycondensation, said inert filler being selected from the group consisting of amphoteric metal oxides, oxides, alkoxides and hydroxides of aluminum, double salts of alkali metals or alkaline earth metals with aluminum and aluminosilicates, the molar excess of the Lewis acid being from 0.02 to 1.00 based on the molar amount of carbonyl groups and acyl halide groups present in the reaction mixture.

2. A process as defined in claim 1, wherein the inert filler or the component which can be converted into an inert filler is added in an amount of from 0.1 to 50% by weight, based on the weight of the prepared polymer.

3. A process as defined in claim 1, wherein the polycondensation is carried out in the absence of a Lewis base.

4. A process as defined in claim 1, wherein the polycondensation is carried out in an inert solvent.

\* \* \* \* \*